US011762937B2

(12) United States Patent
Kitoh

(10) Patent No.: US 11,762,937 B2
(45) Date of Patent: Sep. 19, 2023

(54) INFORMATION PROCESSING APPARATUS, INFORMATION PROCESSING SYSTEM, AND METHOD OF PROCESSING INFORMATION

(71) Applicant: Naoya Kitoh, Tokyo (JP)

(72) Inventor: Naoya Kitoh, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 135 days.

(21) Appl. No.: 17/097,357

(22) Filed: Nov. 13, 2020

(65) Prior Publication Data

US 2021/0165846 A1 Jun. 3, 2021

(30) Foreign Application Priority Data

Nov. 29, 2019 (JP) ................................. 2019-217394
Sep. 29, 2020 (JP) ................................. 2020-163650

(51) Int. Cl.
*G06F 16/955* (2019.01)
*H04L 51/02* (2022.01)
*G06F 16/9032* (2019.01)
*H04L 67/00* (2022.01)

(52) U.S. Cl.
CPC .... *G06F 16/9566* (2019.01); *G06F 16/90332* (2019.01); *H04L 51/02* (2013.01); *H04L 67/34* (2013.01)

(58) Field of Classification Search
CPC ... H04L 51/02; H04L 67/34; G06F 16/90332; G06F 16/9566
See application file for complete search history.

(56) References Cited

U.S. PATENT DOCUMENTS

| 10,431,219 B2* | 10/2019 | Danila ..................... G10L 15/30 |
| 11,178,084 B2* | 11/2021 | Abdelmalek ........... H04L 67/02 |
| 11,388,128 B1* | 7/2022 | Voss ........................ H04L 51/42 |
| 2014/0108583 A1* | 4/2014 | Kulkarni ............... H04L 51/214 709/206 |
| 2015/0019217 A1* | 1/2015 | Di Cristo ................ G10L 15/26 704/235 |
| 2016/0026962 A1* | 1/2016 | Shankar ........... G06Q 10/06398 705/7.42 |
| 2016/0203523 A1* | 7/2016 | Spasojevic ......... G06Q 30/0269 705/14.66 |
| 2016/0308799 A1* | 10/2016 | Schubert ................. H04L 67/22 |
| 2018/0060029 A1* | 3/2018 | Kogan .................. G06F 16/951 |

(Continued)

FOREIGN PATENT DOCUMENTS

| JP | 2018-128843 | 8/2018 |
| JP | 2018-160088 | 10/2018 |

(Continued)

*Primary Examiner* — Patrice L Winder
(74) *Attorney, Agent, or Firm* — IPUSA, PLLC

(57) ABSTRACT

An information processing apparatus connectable with a user terminal via a network, includes circuitry configured to acquire information input to the user terminal by a user; search response information to be responded to the input information; respond, to the user terminal, a response message based on the response information to the input information; set a plurality of modes each used for performing a dialogue with the user terminal; and store history information of the dialogue that is performed with the user terminal using each of the plurality of modes in a memory.

11 Claims, 13 Drawing Sheets

INQUIRY HISTORY DB

| ID | SESSION ID | CATEGORY ID ASSOCIATED WITH HIT QUESTION | ID OF HIT QUESTION | USER INPUT | FEED-BACK | DATE |
|---|---|---|---|---|---|---|
| 3-1 | zeta/Guest/aaa···.bbbb | 0-05 | 1-55 | WANT TO KNOW INSURANCE TYPE | Yes | 2018-04-11T10:15 |
| 3-2 | zeta/Guest/36c2a9cc-6258-4276-ab0d-d2b739ac65a3 | 0-03 | 1-11 | TO DO THINGS WHEN CHILD IS BORN | Yes | 2018-03-30T14:01 |
| 3-3 | zeta/Guest/36c2a9cc-6258-4276-ab0d-d2b739ac65a3 | 0-03 | 1-12 | APPLICATION FOR MATERNITY GIFT | No | 2018-03-30T14:15 |
| 3-4 | zeta/Guest/xxx···.yyy···.zzz | 0-05 | 1-56 | HOW TO SUBSCRIBE INSURANCE | No | ... |
| 3-5 | zeta/Guest/xxx···.yyy···.zzz | 0-05 | 1-57 | HOW TO SUBSCRIBE LIFE INSURANCE | Yes | ... |
| 3-6 | zeta/Guest/xxx···.yyy···.zzz | 0-05 | 1-58 | WANT TO KNOW HOW TO CANCEL INSURANCE | Yes | ... |
| ... | ... | ... | ... | ... | ... | ... |

(56) References Cited

U.S. PATENT DOCUMENTS

| | | | |
|---|---|---|---|
| 2018/0090135 A1* | 3/2018 | Schlesinger | H04L 51/16 |
| 2018/0227251 A1 | 8/2018 | Takishima et al. | |
| 2018/0330252 A1 | 11/2018 | Sawano et al. | |
| 2019/0043106 A1* | 2/2019 | Talmor | G06N 20/00 |
| 2019/0065465 A1* | 2/2019 | Cristian | H04L 51/216 |
| 2019/0089656 A1* | 3/2019 | Johnson, Jr. | H04L 51/02 |
| 2019/0288962 A1* | 9/2019 | Miyata | H04L 51/02 |
| 2019/0288963 A1* | 9/2019 | Sugimoto | G06F 3/1204 |
| 2019/0340527 A1* | 11/2019 | Liden | H04L 51/02 |
| 2020/0026758 A1 | 1/2020 | Kitoh | |
| 2021/0081837 A1* | 3/2021 | Polleri | G06F 16/90332 |
| 2021/0117456 A1* | 4/2021 | Katz | G06F 40/284 |
| 2021/0165846 A1* | 6/2021 | Kitoh | H04L 51/02 |
| 2021/0342168 A1* | 11/2021 | Lewis | G06F 40/20 |

FOREIGN PATENT DOCUMENTS

| | | |
|---|---|---|
| JP | 2018-195298 | 12/2018 |
| JP | 2020-071610 | 5/2020 |

\* cited by examiner

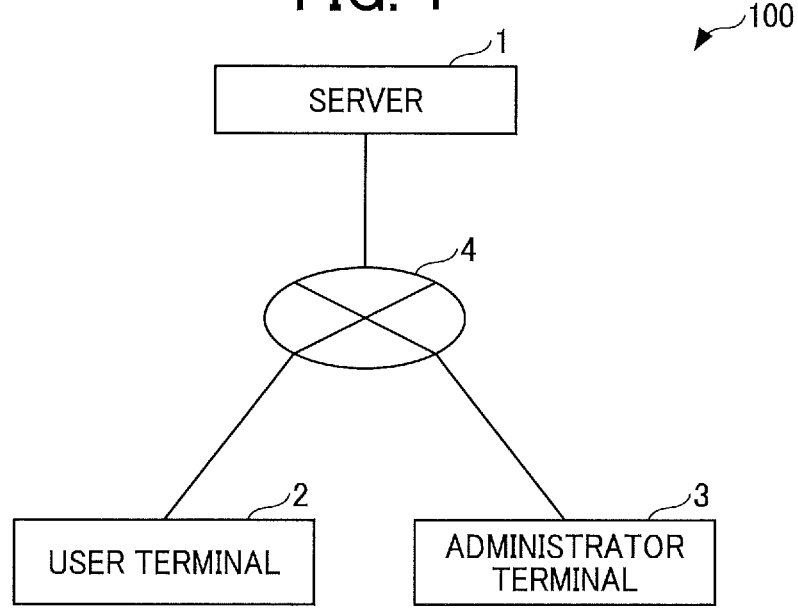
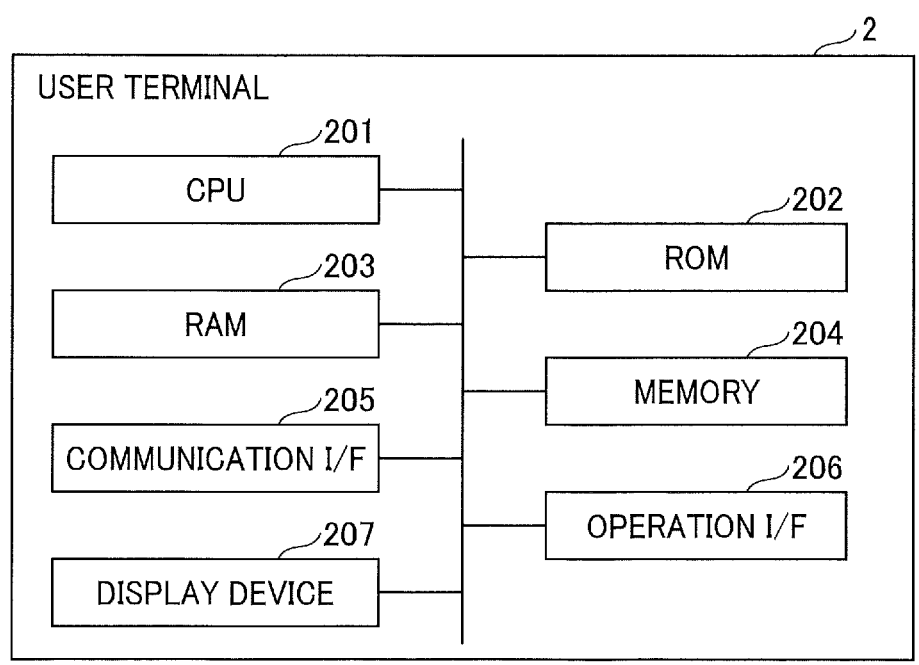

FIG. 6

CATEGORY DB

| ID | CATEGORY NAME | UPDATE DATE |
|---|---|---|
| 0-1 | MOVE-IN | 2017-07-11T07:07 |
| 0-2 | MOVE-OUT | 2017-07-11T07:10 |
| 0-3 | CELEBRATION | 2018-02-07T16:40 |
| 0-4 | FUNERAL | 2018-02-07T16:55 |
| 0-5 | INSURANCE | 2017-03-14T10:30 |
| 0-6 | GROUP | 2018-03-08T09:30 |
| 0-7 | DELIVERY DATE | 2018-06-12T14:20 |
| ⋮ | ⋮ | ⋮ |

FIG. 7

QUESTION-ANSWER DB

| ID | QUESTION | SIMILAR QUESTION | ANSWER | CATEGORY ID | UPDATE DATE |
|---|---|---|---|---|---|
| ⋮ | ⋮ | ⋮ | ⋮ | ⋮ | ⋮ |
| 1-11 | LIST OF PROCEDURE WHEN CHILD IS BORN | — | WHEN EMPLOYEE OR SPOUSE GIVE BIRTH, FOLLOWING APPLICATIONS ARE REQUIRED. 1: APPLICATION OF CHANGE OF FAMILY MEMBER (MUST) 2: APPLICATION FOR MATERNITY GIFT 3: HEALTH INSURANCE DEPENDENT CHANGE NOTIFICATION 4: HEALTH INSURANCE MATERNITY ALLOWANCE APPLICATION 5: APPLICATION FOR SUSPENSION OF COMMUTING ALLOWANCE | 0-03 | 2018-02-07T16:22 |
| 1-12 | APPLICATION FOR MATERNITY GIFT | — | WHEN EMPLOYEE OR SPOUSE GIVE BIRTH, MATERNITY GIFT AND BIRTH COST IS PROVIDED, AND SPECIAL LEAVES ARE GIVEN. | 0-03 | 2018-02-07T16:40 |
| ⋮ | ⋮ | ⋮ | ⋮ | ⋮ | ⋮ |
| 1-33 | HOW TO USE EASY ESTIMATION OF DELIVERY DATE | ⋮ | SELECT OR INPUT FIELD OF ORDERED PRODUCT | 0-07 | 2018-06-12T14:20 |
| ⋮ | ⋮ | ⋮ | ⋮ | ⋮ | ⋮ |

FIG. 8

INQUIRY HISTORY DB

| ID | SESSION ID | CATEGORY ID ASSOCIATED WITH HIT QUESTION | ID OF HIT QUESTION | USER INPUT | FEED-BACK | DATE |
|---|---|---|---|---|---|---|
| 3-1 | zeta/Guest/aaa⋯.bbbb | 0-05 | 1-55 | WANT TO KNOW INSURANCE TYPE | Yes | 2018-04-11T10:15 |
| 3-2 | zeta/Guest/36c2a9cc-6258-4276-ab0d-d2b739ac65a3 | 0-03 | 1-11 | TO DO THINGS WHEN CHILD IS BORN | Yes | 2018-03-30T14:01 |
| 3-3 | zeta/Guest/36c2a9cc-6258-4276-ab0d-d2b739ac65a3 | 0-03 | 1-12 | APPLICATION FOR MATERNITY GIFT | No | 2018-03-30T14:15 |
| 3-4 | zeta/Guest/xxx⋯.yyy⋯.zzz | 0-05 | 1-56 | HOW TO SUBSCRIBE INSURANCE | No | ⋯ |
| 3-5 | zeta/Guest/xxx⋯.yyy⋯.zzz | 0-05 | 1-57 | HOW TO SUBSCRIBE LIFE INSURANCE | Yes | ⋯ |
| 3-6 | zeta/Guest/xxx⋯.yyy⋯.zzz | 0-05 | 1-58 | WANT TO KNOW HOW TO CANCEL INSURANCE | Yes | ⋯ |
| ⋯ | ⋯ | ⋯ | ⋯ | ⋯ | ⋯ | ⋯ |

FIG. 9

| FIG. 9A | FIG. 9B |

FIG. 9A

DIALOGUE HISTORY DB

| ID | SESSION ID | SPOKEN PERSON 0: ADMINISTRATOR 1: USER | SPOKEN CONTENT | SPOKEN TYPE ID CATEGORY: 5-0 QUESTION-ANSWER: 5-1 SCENARIO: 5-2 | CONTENT ID | DATE | MODE |
|---|---|---|---|---|---|---|---|
| 4-1 | zeta/Guest/36c2a9cc-6258-4276-ab0d-d2b739ac65a3 | 0 | ANY QUESTION? SELECT INPUTTING QUESTION DIRECTLY OR METHOD OF CHECKING FROM BUTTON | 5-2 | 6-1 | 2018-03-30 T14:01:29.3 | TEST MODE |
| 4-2 | zeta/Guest/36c2a9cc-6258-4276-ab0d-d2b739ac65a3 | 1 | TO DO THINGS WHEN CHILD IS BORN | – | – | 2018-03-30 T14:03:31.1 | TEST MODE |
| 4-3 | zeta/Guest/36c2a9cc-6258-4276-ab0d-d2b739ac65a3 | 0 | ANSWER LIST OF PROCEDURE WHEN CHILD IS BORN. WHEN EMPLOYEE OR SPOUSE GIVE BIRTH, FOLLOWING APPLICATIONS ARE REQUIRED. 1: APPLICATION OF CHANGE OF FAMILY MEMBER (MUST) 2: APPLICATION FOR MATERNITY GIFT 3: HEALTH INSURANCE DEPENDENT CHANGE NOTIFICATION 4: HEALTH INSURANCE MATERNITY ALLOWANCE APPLICATION 5: APPLICATION FOR SUSPENSION OF COMMUTING ALLOWANCE | 5-1 | 1-11 | 2018-03-30 T14:03:31.7 | TEST MODE |
| 4-4 | zeta/Guest/36c2a9cc-6258-4276-ab0d-d2b739ac65a3 | 0 | THIS ANSWER SOLVES QUESTION? END ANSWER BY YES OR NO. | 5-2 | 6-3 | 2018-03-30 T14:03:32.4 | TEST MODE |
| 4-5 | zeta/Guest/36c2a9cc-6258-4276-ab0d-d2b739ac65a3 | 1 | YES | 5-2 | 6-4 | 2018-03-30 T14:03:35.6 | TEST MODE |
| 4-6 | zeta/Guest/36c2a9cc-6258-4276-ab0d-d2b739ac65a3 | 0 | THANK YOU | 5-2 | 6-6 | 2018-03-30 T14:03:36.3 | TEST MODE |

FIG. 9B

| | | | | | | |
|---|---|---|---|---|---|---|
| 4-7 | zeta/Guest/36c2a9cc-6258-4276-ab0d-d2b739ac65a3 | 0 | ANY QUESTION? SELECT INPUTTING QUESTION DIRECTLY OR METHOD OF CHECKING FROM BUTTON | 5-2 | 6-1 | 2018-03-30T14:03:38.3 EXECUTION MODE |
| 4-8 | zeta/Guest/36c2a9cc-6258-4276-ab0d-d2b739ac65a3 | 1 | APPLICATION FOR MATERNITY GIFT | – | – | 2018-03-30T14:06:53.1 EXECUTION MODE |
| 4-9 | zeta/Guest/36c2a9cc-6258-4276-ab0d-d2b739ac65a3 | 0 | THERE ARE SOME CANDIDATES. CANDIDATE IS FOUND ? LIST OF PROCEDURE WHEN CHILD IS BORN MATERNITY GIFT NOT FOUND IN CANDIDATES | 5-1 | 1-13 | 2018-03-30T14:06:53.8 EXECUTION MODE |
| 4-10 | zeta/Guest/36c2a9cc-6258-4276-ab0d-d2b739ac65a3 | 1 | MATERNITY GIFT | – | – | 2018-03-30T14:08:56.5 EXECUTION MODE |
| 4-11 | zeta/Guest/36c2a9cc-6258-4276-ab0d-d2b739ac65a3 | 0 | WHEN EMPLOYEE OR SPOUSE GIVE BIRTH, MATERNITY GIFT AND BIRTH COST IS PROVIDED, AND SPECIAL LEAVES ARE GIVEN. | 5-1 | 1-12 | 2018-03-30T14:08:56.9 EXECUTION MODE |
| 4-12 | zeta/Guest/36c2a9cc-6258-4276-ab0d-d2b739ac65a3 | 0 | THIS ANSWER SOLVES QUESTION? END ANSWER BY YES OR NO. | 5-2 | 6-3 | 2018-03-30T14:08:57.4 EXECUTION MODE |
| 4-13 | zeta/Guest/36c2a9cc-6258-4276-ab0d-d2b739ac65a3 | 1 | NO | 5-2 | 6-5 | 2018-03-30T14:09:32.5 EXECUTION MODE |
| 4-14 | zeta/Guest/36c2a9cc-6258-4276-ab0d-d2b739ac65a3 | 0 | SORRY. ANSWER IS NOT FOUND. PLEASE CONTACT USER DESK OR CHANGE SEARCH METHOD AND TERM FOR ASKING QUESTION. | 5-2 | 6-7 | 2018-03-30T14:09:32.9 EXECUTION MODE |

INFORMATION PROCESSING APPARATUS, INFORMATION PROCESSING SYSTEM, AND METHOD OF PROCESSING INFORMATION

CROSS-REFERENCE TO RELATED APPLICATION

This application claims priority pursuant to 35 U.S.C. § 119(a) to Japanese Patent Application Nos. 2019-217394, filed on Nov. 29, 2019 and 2020-163650, filed on Sep. 29, 2020 in the Japan Patent Office, the disclosure of each of which is incorporated by reference herein in its entirety.

BACKGROUND

Technical Field

This disclosure relates to an information processing apparatus, an information processing system, and a method of processing information.

Background Art

Conventionally, apparatuses such as computers answer to questions input by users, and such computers are known as "chatbot" or simply referred to as "bot."

As to known chatbot systems, when a question is input to the chatbot systems, a field to which the question belongs is inferred. Further, as to the known chatbot systems, users enter satisfaction levels after the chatbot systems perform the answering.

Further, as to the known chatbot systems, history information of chat performed by the chatbot is stored, and then statistical processing is performed on the history information of chat to analyze the history information of chat, and the obtained analysis result is used to improve precision of answers to the questions input by users.

SUMMARY

As one aspect of the present disclosure, an information processing apparatus connectable with a user terminal via a network is devised. The information processing apparatus includes circuitry configured to acquire information input to the user terminal by a user; search response information to be responded to the input information; respond, to the user terminal, a response message based on the response information to the input information; set a plurality of modes each used for performing a dialogue with the user terminal; and store history information of the dialogue that is performed with the user terminal using each of the plurality of modes in a memory.

As another aspect of the present disclosure, an information processing system is devised. The information processing system includes a user terminal configured to receive an input from a user; and an information processing apparatus connectable with the user terminal via a network. The information processing apparatus includes circuitry configured to acquire information input to the user terminal by a user; search response information to be responded to the input information; respond, to the user terminal, a response message based on the response information to the input information; set a plurality of modes each used for performing a dialogue with the user terminal; and store history information of the dialogue that is performed with the user terminal using each of the plurality of modes in a memory.

As another aspect of the present disclosure, a method of processing information using an information processing apparatus connectable with a user terminal via a network is devised. The method includes acquiring information input to the user terminal by a user; searching response information to be responded to the input information; responding, to the user terminal, a response message based on the response information to the input information; setting a plurality of modes each used for performing a dialogue with the user terminal; and storing history information of the dialogue that is performed with the user terminal using each of the plurality of modes in a memory.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 1 is an example of configuration of an information processing system according to an embodiment of this disclosure;

FIG. 2 is an example of configuration of hardware block diagram of user terminal;

FIG. 6 is an example of category information;

FIG. 7 is an example of question-answer information;

FIG. 8 is an example of inquiry history information;

FIGS. 9A and 9B are an example of dialogue history information;

Figure 3:
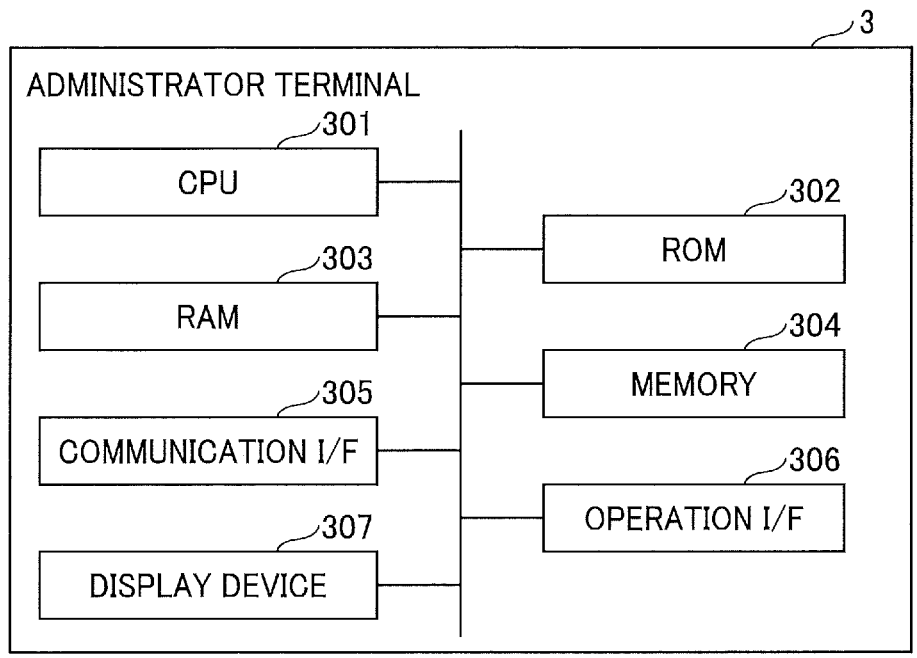
FIG. 3 is an example of configuration of hardware block diagram of administrator terminal.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

Further, it should be noted that the terminology used herein is for the purpose of describing particular embodiments only and is not intended to be limiting of the present inventions. Thus, for example, as used herein, the singular forms "a", "an" and "the" are intended to include the plural foul's as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

(Configuration of Information Processing System)

FIG. 1 is an example of configuration of an information processing system according to an embodiment of this disclosure. For example, a chatbot system 100, which is an example of the information processing system, employs a system configuration including, for example, a server 1, and a user terminal 2 used as information processing apparatuses. Further, as illustrated in FIG. 1, the chatbot system 100 may further include an apparatus other than the server 1 and the user terminal 2, such as an administrator terminal 3.

The server 1 is an example of information processing apparatus that can provide a chatbot service.

The user terminal 2 is an information processing apparatus that performs operations, such as inputting a question spoken by a user for the chatbot service. Further, the number of the user terminals 2 connected in the chatbot system 100 can be two or more. Further, the user terminal 2 may not be required to be connected to a communication network 4 constantly.

The administrator terminal 3 is an information processing apparatus, with which an administrator or the like performs given operations, such as an input operation, to manage or control the server 1.

The server 1, the user terminal 2, and the administrator terminal 3 are connectable with each other via, for example, the communication network 4.

For example, the communication network 4 employs the Internet. Further, the communication network 4 may use a network of local area network (LAN), wide-area network (WAN), short-range communication using wired or wireless communication, or a combination thereof.

The server 1 communicates with the user terminal 2 and the administrator terminal 3. For example, the server 1 provides a chatbot service, in which when a user inputs a question, the server 1 returns a response, such as response message or answer message. In this description, the terms of "answer" and "response" are used interchangeably.

Further, the server 1 also provides services, such as transmitting and receiving messages among a plurality of users (i.e., chatting). The server 1 provides instant messaging service among the plurality of users. Further, various services may be provided using a plurality of information processing apparatuses.

Hereinafter, with reference to FIG. 1, a description is given of an example case that the server 1, configured as one information processing apparatus, provides the services, such as chatbot service.

As to the chatbot service, a user inputs texts or characters indicating a question (hereinafter, "input information") to the user terminal 2. Then, the server 1 acquires or obtains the input information from the user terminal 2 via the communication network 4. Then, the server 1 searches information (hereinafter referred to as "response information" or "answer information") that becomes an answer to the question indicated by the input information. Then, the server 1 generates a response message based on the response information to the input information, and responds the response message to the user terminal 2 via the communication network 4.

Then, the user terminal 2 displays the response information to the input information using a format of the response message. Then, the user using the chatbot service can obtain an answer to the question by checking or confirming the displayed response message.

The server 1, the user terminal 2, and the administrator terminal 3 used for implementing the chatbot service employs, for example, a hardware configuration and data configuration to be described below.

(User Terminal)

FIG. 2 is an example of configuration of hardware block diagram of the user terminal 2. For example, the user terminal 2 includes a central processing unit (CPU) 201, a read only memory (ROM) 202, a random access memory (RAM) 203, memory 204, a communication interface (I/F) 205, an operation interface (I/F) 206, and a display device 207 as hardware resources. Further, the hardware resources of the user terminal 2 are connected to each other using, for example, bus or the like. Further, the hardware resources of the user terminal 2 may be connected to other device by wire or wireless communication.

The user terminal 2 is an information processing apparatus, such as personal computer (PC), smart phone, or tablet.

The CPU 201 implements functions, such as computing unit and control unit. Further, the CPU 201 is an example of a control device and computing device.

The ROM 202 is a storage device such as nonvolatile semiconductor.

The RAM 203 is a storage device such as volatile semiconductor.

The memory 204 is an example of a main storage device. For example, the memory 204 stores information acquired via the communication network 4. Further, the user terminal 2 may include an auxiliary storage device, such as hard disk or solid state drive (SSD). Further, the ROM 202, the RAM 203, and the memory 204 implement a function of storage unit.

The communication I/F 205 implements a function, such as communication unit. For example, the communication I/F 205 may be connection terminal and communication circuit.

The operation I/F 206 implements a function, such as input unit. For example, the operation I/F 206 is an input device, such as button, keyboard, dial, key, touch panel, microphone, or the like.

The display device 207 implements a function, such as output unit. For example, the display device 207 is an output device, such as liquid crystal panel, organic electroluminescence (OEL), or inorganic EL. Further the display device 207 and the operation I/F 206 may be integrated as a touch panel.

Further, the program may be stored in, for example, the auxiliary storage device, in addition to or instead of the ROM 202 and the memory 204. Further, the program may be acquired via the network such as the communication network 4.

(Administrator Terminal)

FIG. 3 is an example of configuration of hardware block diagram of the administrator terminal 3. For example, the administrator terminal 3 includes a CPU 301, a ROM 302, a RAM 303, a memory 304, a communication I/F 305, an operation I/F 306, and a display device 307 as hardware resources. In this description, since the administrator terminal 3 employs the same hardware configuration as that of the user terminal 2, the description thereof is omitted. However, the administrator terminal 3 may employ a hardware configuration different from that of the user terminal 2 and the server 1.

(Server)

Figure 4:
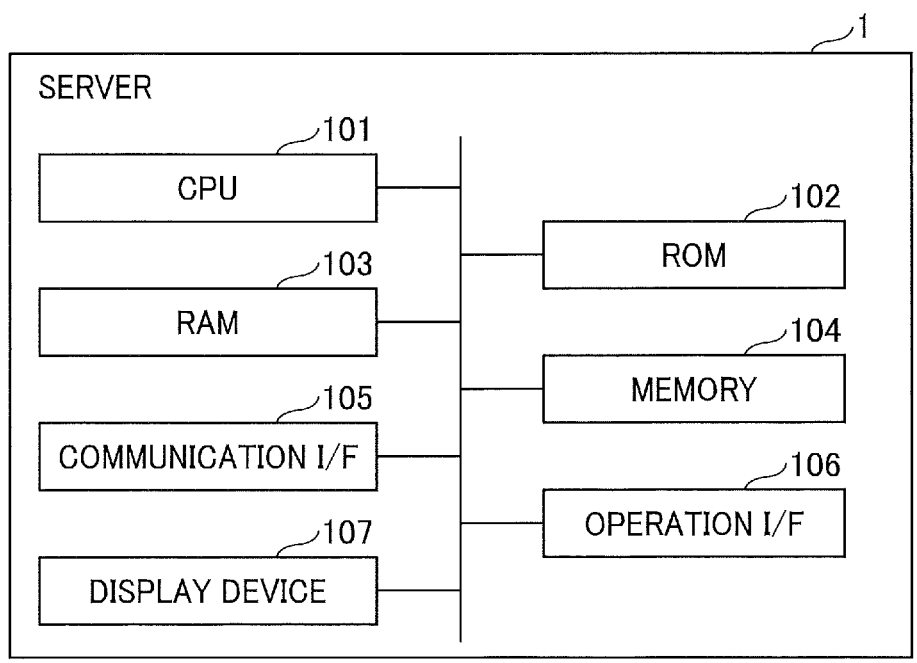
FIG. 4 is an example of configuration of hardware block diagram of server.

FIG. 4 is an example of configuration of hardware block diagram of the server 1. For example, the server 1 includes a CPU 101, a ROM 102, a RAM 103, memory 104, a communication I/F 105, an operation I/F 106, and a display device 107 as hardware resources. In this description, since the server 1 employs the same hardware configuration as that of the user terminal 2, the description thereof is omitted. However, the server 1 may employ a hardware configuration different from that of the user terminal 2 and the administrator terminal 3.

(Database)

When the chatbot service is performed in the chatbot system 100, the server 1 configures, for example, following databases (DBs) in advance. Hereinafter, a description is given of a case that the server 1 configures keyword DB, thesaurus DB, dialogue scenario DB, category DB, question-answer DB, inquiry history DB, dialogue history DB, and contract information DB.

The keyword DB stores text or character string indicating characteristics or feature of question and answer, that is used as keyword. The keyword may be word, phrase, or sentence. Further, the keyword DB may store keywords related to things other than question-answer information.

For example, at first, the server 1 decomposes a text string constituting an input question into each word. Then, the server 1 compares each word with words stored in the keyword DB to search a keyword related to the input question. Then, the server 1 searches a word, which matches the keyword, from the text string of "question" in the question-answer DB, and searches question-answer information to the input question. With this configuration, the server 1 uses the keyword DB to extract the keyword indicated by the input question.

The thesaurus DB stores thesaurus information or synonym information on keyword. For example, the thesaurus information is information that associates text strings indicating similar meaning with each other. Further, the text string may be word, phrase, and sentence.

Further, the text strings whose meanings are similar to each other are not limited to the text strings having the similar meaning. For example, the text strings whose meaning are similar to each another include a text string that can be estimated from another text string, a text string that is a part of another text string, or a text string that is used in similar situation. Further, the thesaurus information may be arbitrarily defined according to the use situation.

The server 1 decomposes one text string constituting a question, which is the input information, into each word. Then, the server 1 compares each word with the thesaurus DB to extract a text string that becomes a thesaurus. Then, the server 1 refers the word included in the input question and the thesaurus of the word to the keyword DB to estimate a keyword related to the input question.

The dialogue scenario DB stores scenario information that provides each dialogue corresponding to the input information. For example, the server 1 creates the scenario information so that a dialogue is performed with a user in accordance with a scenario input into the dialogue scenario DB in advance.

Figure 5:
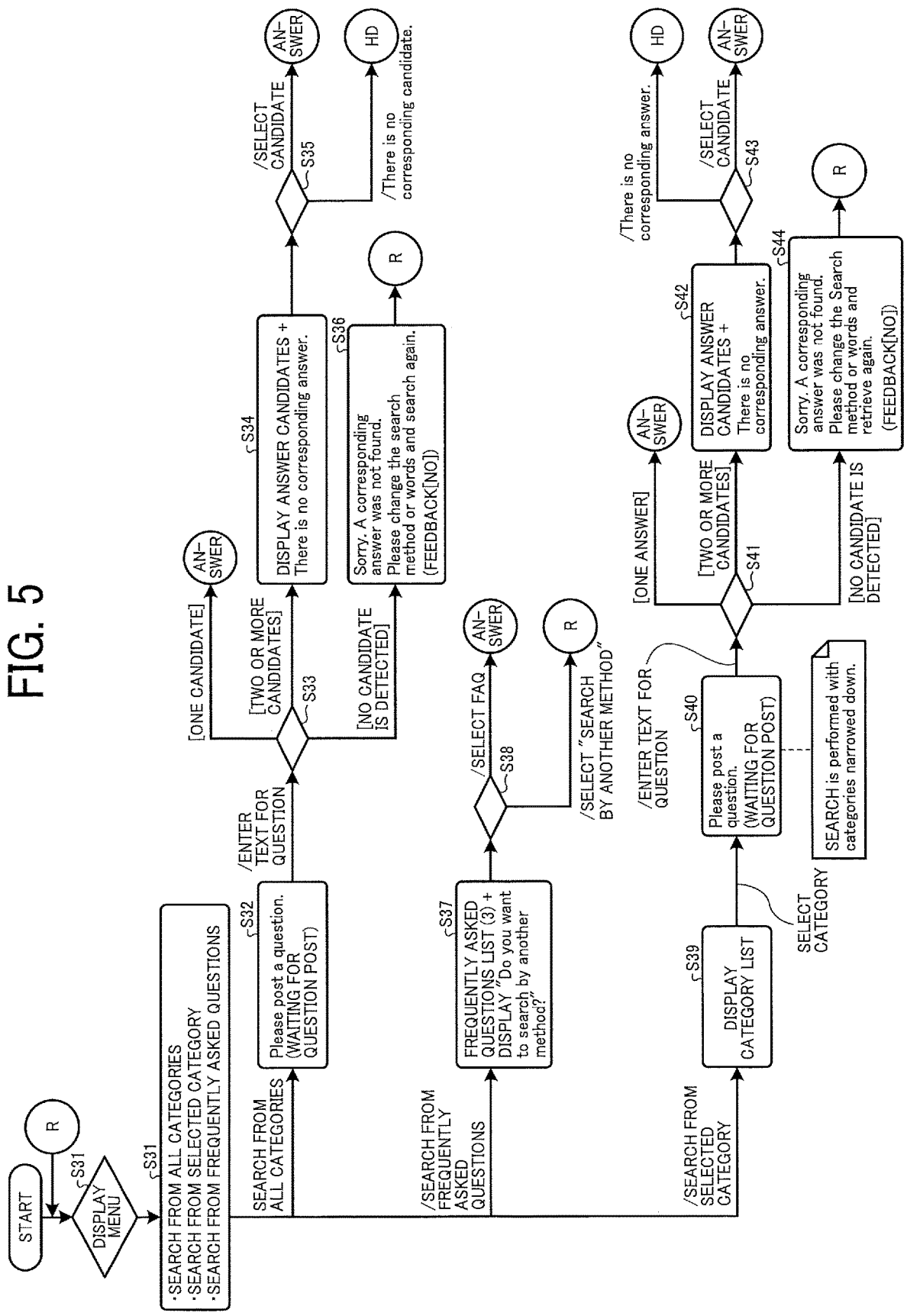
FIG. 5 is an example of flow of dialogue based on scenario information.

FIG. 5 is an example of flow of dialogue based on scenario information. For example, when a user inputs or enters input information, such as question, a flow of responding a response message or answer message can be performed based on the scenario information as indicated in FIG. 5.

(Flow of Dialogue Based on Scenario Information)

For example, the chatbot system 100 is input with scenario information by an administrator in advance to provide a flow illustrated in FIG. 5. Then, the chatbot system 100 performs a dialogue with a user based on the scenario information. Specifically, the chatbot system 100 is set with various information, such as scenario information, database, and graphical user interface (GUI) or the like in advance to enable communication indicated in the flow illustrated in FIG. 5. Hereinafter, with reference to FIG. 5, a description is given of the flow in detail.

In step S31, at first, the chatbot system 100 causes the user terminal 2 to display a selection menu, which displays a method of setting a question used for searching. For example, the selection menu is a GUI that receives a selection operation performed by a user, such as selecting from three options, such as "search from all categories," "search from selected category," and "search from frequently asked questions (FAQ)." Further, the selection menu may display four or more options or two or less options.

If a user selects "search from all categories" ("search from all categories" in FIG. 5) on the selection menu in step S31, the chatbot system 100 proceeds the sequence to step S32.

Further, if the user selects "search from frequently asked questions (FAQ)" ("search from frequently asked questions (FAQ)" in FIG. 5) on the selection menu in step S31, the chatbot system 100 proceeds the sequence to step S37.

Further, if the user selects "search from selected category" ("search from selected category" in FIG. 5) on the selection menu in step S31, the chatbot system 100 proceeds the sequence to step S39.

In step S32, the chatbot system 100 causes the user terminal 2 to display a message prompting the user to input or enter a question using text or character. Further, the chatbot system 100 causes the user terminal 2 to display a GUI, such as text box, on the user terminal 2, and receives an operation inputting text or character that becomes the question. When the user inputs the question ("enter text for question" in FIG. 5), the chatbot system 100 proceeds the sequence to step S33.

In step S33, the chatbot system 100 analyzes the text string indicating the question. Then, the chatbot system 100 searches the question-answer DB to extract a candidate that can become an answer to the question (hereinafter, simply referred to as "candidate"). Further, the chatbot system 100 may acquire a plurality of candidates as a result of the searching the question-answer DB.

If the number of candidates is one candidate as a result of the searching in step S33 ("one candidate" in FIG. 5), the chatbot system 100 uses the searched candidate as response information.

Further, if the number of candidates is two or more candidates as a result of the searching in step S33 ("two or more candidates" in FIG. 5), the chatbot system 100 proceeds the sequence to step S34.

Further, if the number of detected candidates is zero as a result of the searching in step S33 ("no candidate is detected" in FIG. 5), the chatbot system 100 proceeds the sequence to step S36.

In step S34, the chatbot system 100 causes the user terminal 2 to display a GUI to be used by the user to perform an operation of selecting any candidate from a plurality of candidates, or an operation of not selecting any candidate from the plurality of candidates.

In step S35, if the operation of selecting any candidate from the plurality of candidates is performed ("select candidate" in FIG. 5), the chatbot system 100 sets the selected candidate as the response information.

On the other hand, in step S35, if the operation of not selecting any candidate from the plurality of candidates is performed ("no corresponding candidate" in FIG. 5), the chatbot system 100 causes the user terminal 2 to display, for example, a sorry message indicating that an answer to the question cannot be displayed at this stage.

In step S36, the chatbot system 100 causes the user terminal 2 to display the sorry message and a message prompting the user to perform a re-searching, and then returns the sequence to step S31.

In step S37, the chatbot system 100 refers to the inquiry history DB to extract one or more questions (e.g., three or more) having higher frequency of inquiring from other users. Then, the chatbot system 100 causes the user terminal 2 to display a list of questions. Further, the chatbot system 100 causes the user terminal 2 to display a GUI, with which other search method can be selected.

In step S38, if a question is selected ("select FAQ" in FIG. 5), the chatbot system 100 sets an answer to the selected question, using a result obtained by searching the question-answer DB, as response information.

On the other hand, in step S38, if another search method is selected ("select search by another method" in FIG. 5), the chatbot system 100 returns the sequence to step S31.

In step S39, the chatbot system 100 causes the user terminal 2 to display a list of category name. Then, if a category is selected from the list of category name ("select category" in FIG. 5), the chatbot system 100 proceeds the sequence to step S40.

In step S40, the chatbot system 100 receives an operation of inputting text that becomes a question. Then, if the question is input or entered ("enter text for question" in FIG. 5), the chatbot system 100 acquires or obtains the question. Then, the chatbot system 100 proceeds the sequence to step S41.

In step S41, the chatbot system 100 searches the question-answer DB to extract a candidate. If the number of candidates is one candidate ("one candidate" in FIG. 5) in step S41, the chatbot system 100 uses the searched candidate as response information.

Further, if the number of candidates is two or more candidates ("two or more candidates" in FIG. 5) in step S41, the chatbot system 100 proceeds the sequence to step S42.

Further, if the number of detected candidates is zero ("no candidate is detected" in FIG. 5) in step S41, the chatbot system 100 proceeds the sequence to step S44.

In step S42, the chatbot system 100 causes the user terminal 2 to display a GUI to be used by the user to perform an operation of selecting any candidate from a plurality of candidates, or an operation of not selecting any candidate from the plurality of candidates.

In step S43, if the operation of selecting any candidate from the plurality of candidates is performed ("select candidate" in FIG. 5) in step S42, the chatbot system 100 sets the selected candidate as the response information.

On the other hand, in step S43, if the operation of not selecting any candidate from the plurality of candidates is performed ("no corresponding candidate" in FIG. 5) in step S42, the chatbot system 100 causes the user terminal 2 to display, for example, a sorry message indicating that an answer to the question cannot be displayed at this stage.

In step S44, the chatbot system 100 causes the user terminal 2 to display the sorry message and a message prompting the user to perform a re-searching, and then returns the sequence to step S31.

As above described, the user, such as administrator, can input scenario information, for example, by assuming the above described flow of dialogue. That is, the scenario information indicates types of GUI used in the dialogue flow, sequential order of outputting message and GUI, which are set by the administrator.

The category DB stores category information for classifying questions. For example, the category information includes following information.

FIG. 6 is an example of the category information. For example, as illustrated in FIG. 6, the category information includes various information, such as "identification (ID)," "category name," and "update date."

"Category name" indicates a category to which each question is corresponded.

"ID" indicates identification, that is, identification of each category.

"Update date" indicates date and time when each information was updated.

The question-answer DB stores information associating questions and answers to the questions (hereinafter, referred to as "question-answer information"). For example, the question-answer information is created by an administrator or the like in advance, and then stored in the question-answer DB. For example, the question-answer information includes following information.

FIG. 7 is an example of question-answer information. For example, as illustrated in FIG. 7, the question-answer information includes various information, such as "ID," "question," "similar question," "answer," "category ID," and "update date."

"ID" indicates ID, that is, identification information of each question-answer information.

"Question" indicates content of question.

"Similar question" indicates a question that has content similar to the question entered in "question."

"Answer" indicates an answer to each question.

"Category ID" indicates ID of category that can identify a category corresponding to the input question.

"Update date" indicates date and time when each information was updated.

The inquiry history DB stores information indicating the question input by the user (hereinafter, referred to as "inquiry history information"). For example, the inquiry history information includes following information.

FIG. 8 is an example of inquiry history information. As illustrated in FIG. 8, the inquiry history information includes various information, such as "ID," "session ID," "ID of category associated with hit question," "ID of hit question," "user input," "feedback," and "date."

"ID" indicates ID, that is, identification information of each inquiry history information.

"Session ID" indicates identification information identifying a dialogue session that was performed based on an input question.

"ID of category associated with hit question" indicates ID of category that can identify a category corresponding to the input question.

"ID of hit question" indicates ID of the input question.

"User input" indicates a question entered or input by a user.

"Feedback" indicates whether the user has made a feedback to an answer responding to a question.

"Date" indicates date and time when a dialogue was performed.

A dialogue session is a set of dialogues performed between the user terminal and the server. For example, a dialogue that becomes the same dialogue session is a dialogue performed at the user terminal 2 from a time of starting a screen used for dialogue, such as chat style, to a time of closing the screen. Further, a dialogue that becomes the same dialogue session is a dialogue performed at the user terminal 2 from a time of starting a screen used for dialogue to a time of closing the screen forcibly due to the session time-out.

Further, the session time-out occurs when no action is performed to the user terminal 2 for a given period of time. The session time-out is processing of terminating the screen used for dialogue.

Further, the dialogue session is not limited to the above described example. For example, one dialogue session can be a period of inputting a question, answering a question to the input question, and then inputting a feedback by a user. In this case, when the feedback is acquired or obtained from the user, the one dialogue sessions is completed.

The dialogue history DB stores information indicating a history of spoken content input at the user terminal 2 and content output from the server 1 for a dialogue performed between the user terminal 2 and the server 1 (hereinafter, referred to as "dialogue history information"). For example, the dialogue history information includes following information.

FIGS. 9A and 9B are an example of dialogue history information. As illustrated in FIGS. 9A and 9B, the dialogue history information includes various information, such as "ID," "session ID," "spoken person," "spoken content," "spoken type ID," "content ID," "date," and "mode."

"ID" indicates ID, that is, identification information of each dialogue history information.

"Session ID" indicates an ID that identifies a dialogue session when a dialogue was performed.

"Spoken person" indicates a type of speaker. Specifically, in FIGS. 9A and 9B, "spoken person" is input with values of "0" or "1." "0" indicates that the speaker is an administrator. "1" indicates that the speaker is a user.

"Spoken content" indicates the content spoken by a speaker.

"Spoken type ID" is input, for example, as "5-0," "5-1," and "5-2." Based on these inputs, "spoken type ID" indicates whether "spoken content" is spoken for any one of "category," "question-answer information" and "scenario."

"Content ID" indicates a spoken content set in the scenario if the spoken type is a scenario. Further, "content ID" indicates ID of question-answer information if the spoken type is question-answer information. Further, the "content ID" indicates a selection of category if the spoken type is a category.

"Date" indicates date and time when a dialogue was performed.

"Mode" indicates which mode is used for the dialogue. The detail of "mode" will be described later.

The contract information DB stores content of contract that is subscribed with a user in advance. For example, the contract is input with information, such as whether or not to perform an in-person response, and a time period of performing a response in advance. Further, the server 1 may retain information, such as the acquired contract information, in association with the tenant ID or the like.

Further, the type and configuration of DB are not limited to the above examples. That is, the DB may use any other format. Further, the DB can be configured to dispersed in a plurality of devices to retain data. Further, each DB may not be required. That is, if data that can implement the scenario is provided, the format of DB is not limited to any specific format.

(Functional Configuration)

Figure 10:
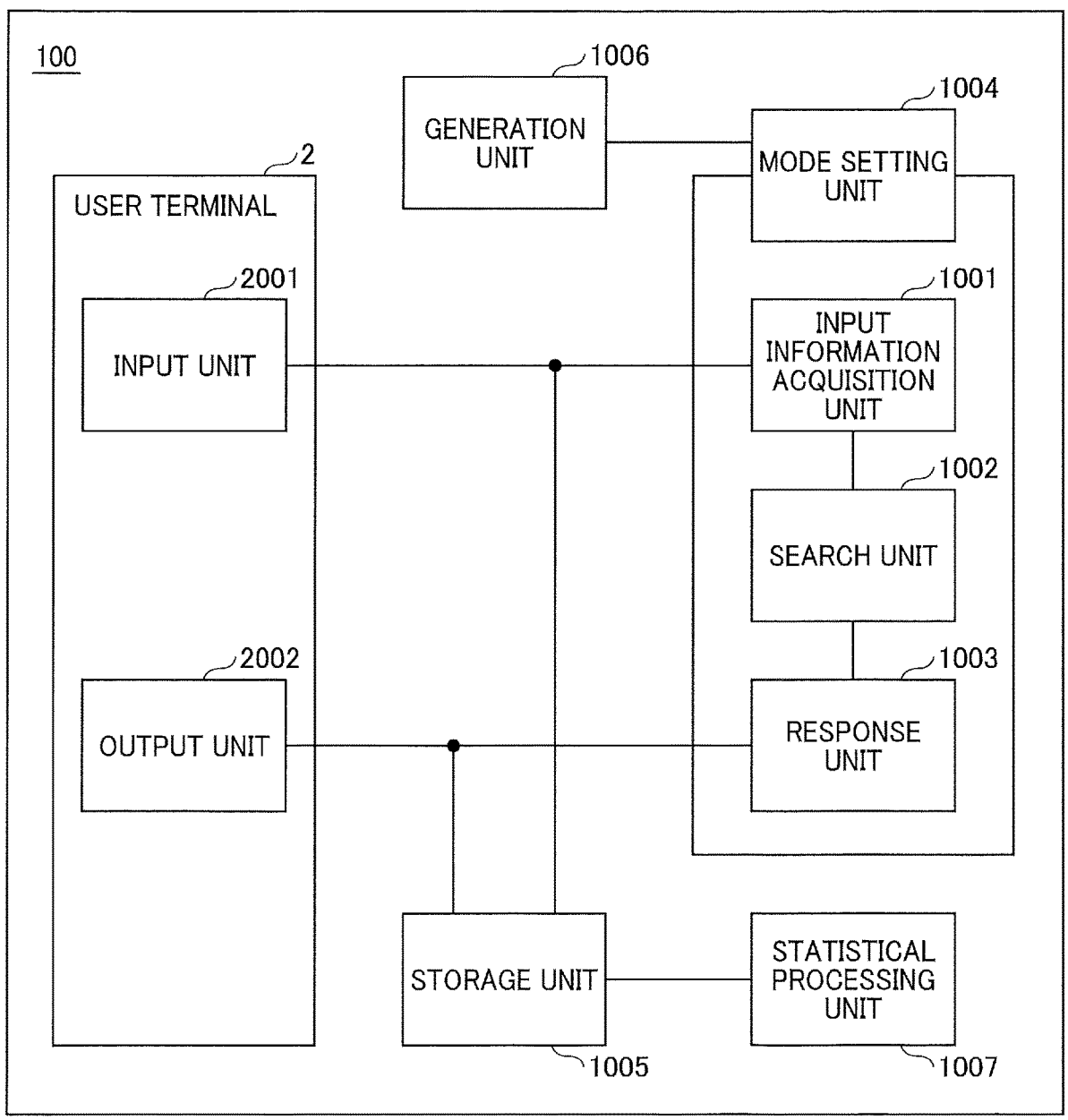
FIG. 10 is an example of configuration of functional block diagram of chatbot system.

FIG. 10 is an example of configuration of functional block diagram of the chatbot system 100. As illustrated in FIG. 10, the chatbot system 100 includes, for example, input information acquisition unit 1001, search unit 1002, response unit 1003, mode setting unit 1004, storage unit 1005, generation unit 1006, and statistical processing unit 1007 as functional units. Further, the user terminal 2 includes, for example, input unit 2001 and output unit 2002 as functional units.

The input information acquisition unit 1001 performs an input information acquisition procedure for acquiring information input to the user terminal 2.

The search unit 1002 performs a search procedure for searching response information to the input information.

The response unit 1003 pedant's a response procedure for responding the response information with respect to the input information, to the user terminal 2.

When the input information acquisition unit 1001, the search unit 1002, and the response unit 1003 are used to input the information input to the input unit 2001 of the user terminal 2, the output unit 2002 of the user terminal 2 outputs the response information with respect to the input information to respond response information or answer information, with which a dialogue, such as chatbot, is implemented.

For example, the input information acquisition unit 1001 acquires the input information from the user terminal 2 using the communication IX 105. Further, for example, the search unit 1002 searches the response information with respect to the input information using the CPU 101. Further, the response unit 1003 responds the response information to the user terminal 2 using the communication I/F 105.

The mode setting unit 1004 performs a mode setting procedure for a dialogue to be performed by the input information acquisition unit 1001, the search unit 1002, and the response unit 1003 under a plurality of modes. For example, the mode setting unit 1004 obtains mode information, and then determines whether the mode is set to a first mode or a second mode based on the retained mode information using the CPU 101. Then, the mode setting unit 1004 sets a mode of storing history information of dialogue to be performed later, or the mode setting unit 1004 sets a mode of not storing history information of dialogue to be performed later (i.e., mode of deleting history information of dialogue to be performed later).

The storage unit 1005 performs a storing procedure for storing the history information of dialogue separately based on the modes. For example, the storage unit 1005 stores the history information of dialogue content in the memory 104 or the like.

The generation unit 1006 performs a generation procedure for generating a code used for performing a dialogue with the user terminal 2 under each mode separately. For example, the generation unit 1006 generates a code for each mode in accordance with a plurality of modes performed by the mode setting unit 1004, using the CPU 101.

The statistical processing unit 1007 performs a statistical processing procedure for processing the history information statistically and outputting a statistical result obtained for the first mode. For example, the statistical processing unit 1007 performs the statistical processing using the history information stored by the storage unit 1005 using the CPU 101.

The server 1 may further include functional units, such as computing unit and control unit, which may be implemented by the CPU 101 or the like. In addition, the server 1 may further include functional units, such as input unit, output unit, storage unit, and communication unit. Further, the user terminal 2 may include functional units, such as computing unit, control unit, storage unit, input unit, output unit, and communication unit.

(Processing)

Figure 11:
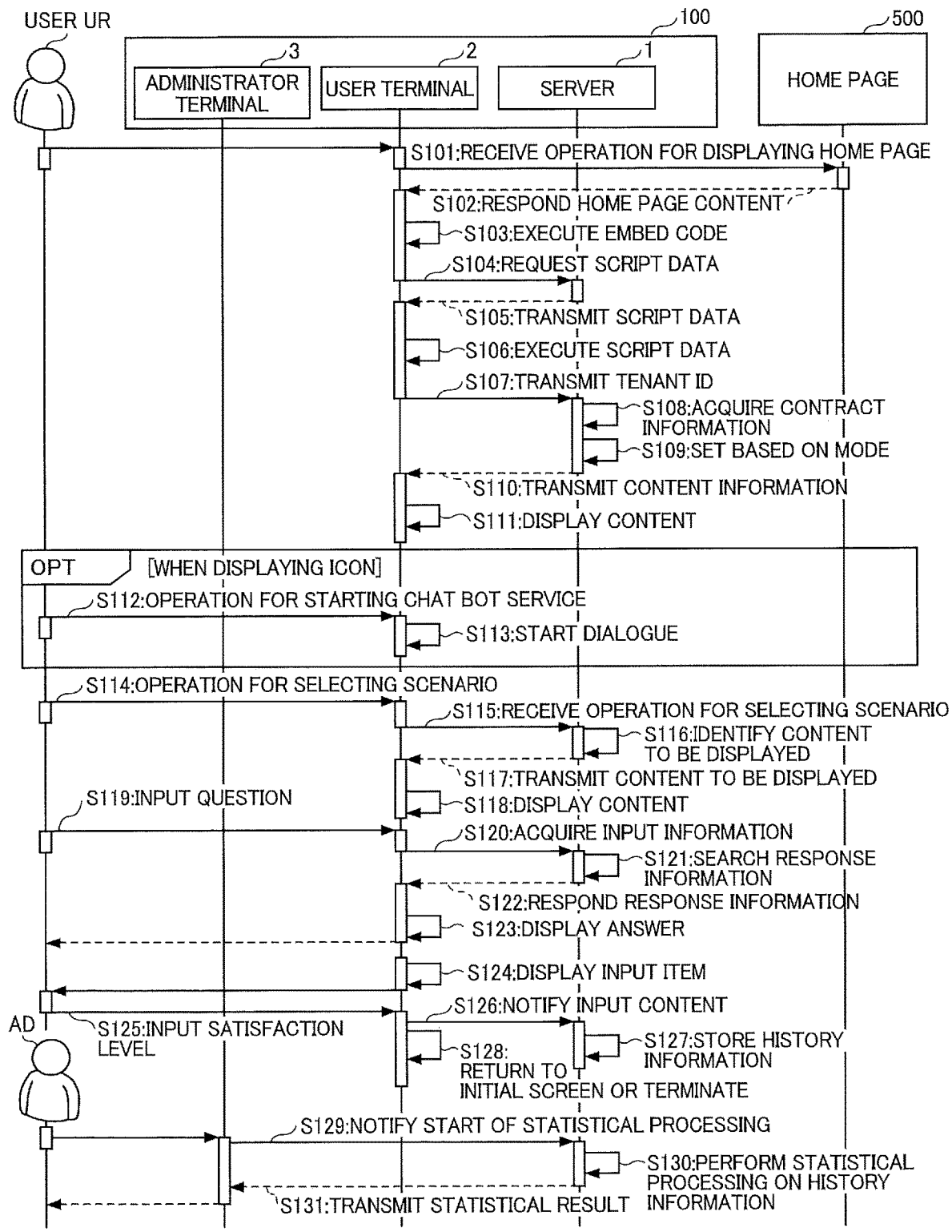
FIG. 11 is an example of sequence diagram of processing for implementing chatbot service.

FIG. 11 is an example of sequence diagram of processing for implementing a chatbot service. Hereinafter, with reference to FIG. 11, a description is given of an example case that the server 1 alone performs processing for implementing the chatbot service.

In step S101, the input unit 2001 of the user terminal 2 receives an operation for starting the chatbot. For example, the input unit 2001 of the user terminal 2 receives an operation of pressing a given icon included in a being-displayed web page, an operation of activating a dialogue application installed on the user terminal 2, or an operation of pressing a given button of the dialogue application installed on the user terminal 2.

In step S102, the home page 500 responds an activation request of the chatbot to the user terminal 2. Specifically, a code is embedded in a source code of the home page 500 in advance as an embed code of the home page 500. By performing step S102, the user terminal 2 can be used to perform the processing based on the embed code of the home page 500.

The code is generated differently for each mode. Specifically, it is preferable to generate different uniform resource locator (URL) for different modes, such as the first mode corresponding to execution mode, and the second mode corresponding to test mode. The generation unit 1006 generates the code for each mode in accordance with a plurality of modes performed by the mode setting unit 1004.

Further, the types of mode may be three or more. Hereinafter, a description is given of an example case of using two types of mode.

Then, in a case of performing a test operation, a code for test mode is embedded in the home page 500. On the other hand, in a case of performing an actual operation, a code for execution mode is embedded in the home page 500.

In step S103, the computing unit of the user terminal 2 executes the code. Specifically, for example, the computing unit of the user terminal 2 executes the code for test mode embedded in the home page 500.

The code is generated differently for each mode by the generation unit 1006. Therefore, the mode setting unit 1004 can switch the mode to be executed based on the code. Therefore, in the subsequent processing, the mode setting unit 1004 identifies or determines which mode is used for performing the dialogue.

In step S104, the communication unit of the user terminal 2 requests script data created by JavaScript (registered trademark) or the like based on the code. For example, the communication unit of the user terminal 2 requests the script data for test mode to the server 1.

In step S105, the communication unit of the server 1 transmits the script data requested in step S104 to the user terminal 2. For example, the communication unit of the server 1 transmits the script data for test mode to the user terminal 2.

In step S106, the computing unit of the user terminal 2 executes the script data. For example, the computing unit of the user terminal 2 executes the script data for test mode.

In step S107, the communication unit of the user terminal 2 transmits a chatbot content request, and a tenant ID identifying a chatbot subscriber (tenant) to the server 1. The communication unit of the user terminal 2 transmits the mode information indicating the mode, such as test mode. Further, the mode setting unit 1004 retains the transmitted mode information.

The tenant ID is information retained by the user terminal 2 in advance. Further, the tenant ID may be retained by a browser used for the chatbot, or an application that implements the chat function.

In step S108, the computing unit of the server 1 acquires contract information corresponding to the tenant ID from the contract information DB. Then, the computing unit of the server 1 determines the contract status based on the tenant ID. Hereinafter, with reference to FIG. 12, a description is given of an example case that the contract is in a status that the chatbot service is available.

Figure 12:
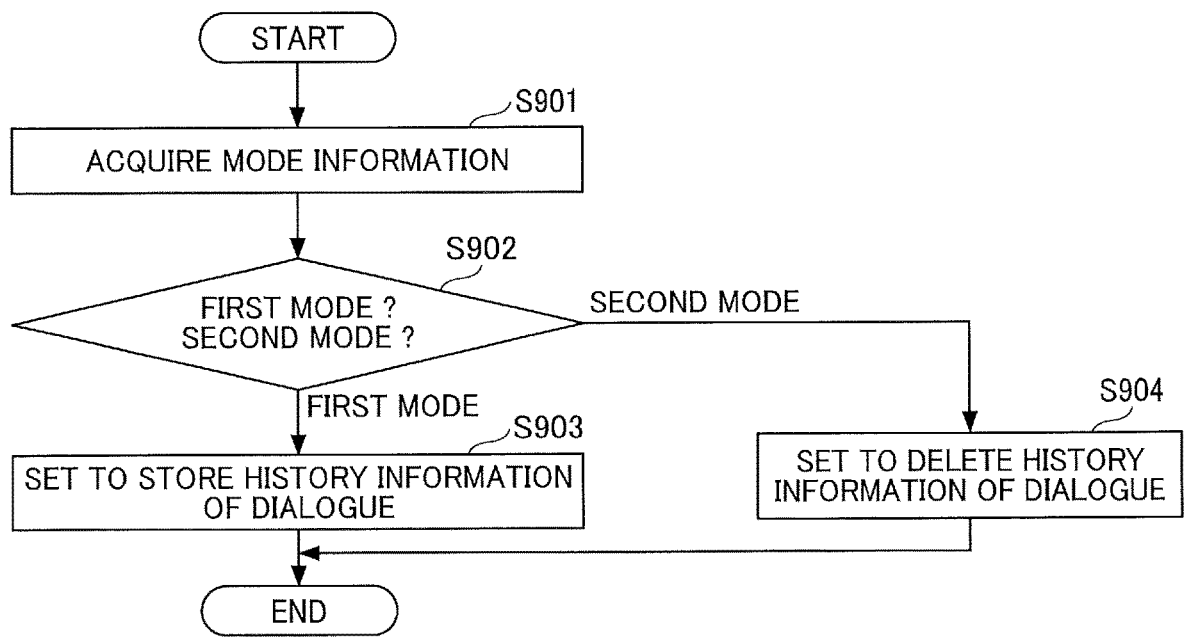
FIG. 12 is an example of flowchart of setting a mode.

In step S109, for example, the server 1 performs the following processing indicated in FIG. 12, based on the mode.

FIG. 12 is an example of flowchart of setting a mode. The processing of FIG. 12, performed in step S109, can be performed at other timing. For example, the processing of FIG. 12 can be performed in step S103 or a timing of activating the chatbot.

In step S901, the mode setting unit 1004 acquires the mode information. Since the mode is identified based on the code to be executed, the mode setting unit 1004 can recognize which mode is to be executed.

In step S902, the mode setting unit 1004 determines whether the mode is the first mode or the second mode based on the retained mode information. The embed code used for test mode and the embed code used for execution mode can be generated in advance as described below.

Figure 13:
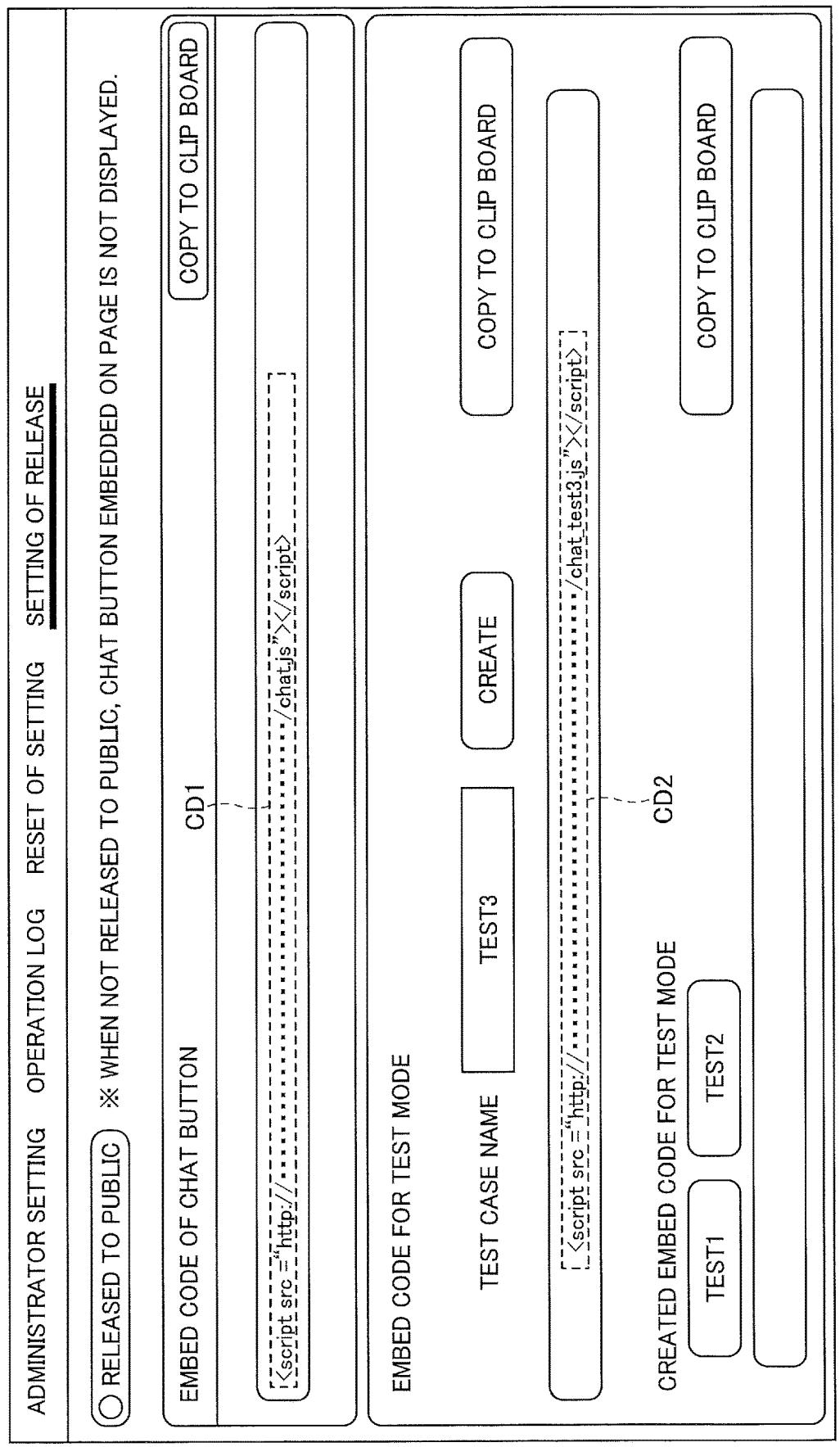
FIG. 13 is an example of screen used for creating or generating a code.

FIG. 13 is an example of screen used for creating or generating a code. The screen illustrated in FIG. 13 is an example of operation screen used for creating or generating an embed code used for test mode.

A first code CD1 is an example of the embed code used for execution mode. A second code CD2 is an example of the embed code used for test mode. As illustrated in FIG. 13, the first code CD1 has "chat.js" at the end of URL. As illustrated in FIG. 13, the second code CD2 has "chat_test3.js" at the end of URL. As above described, the generation unit 1006 creates or generates the code, in which the end of URL is set differently for each mode.

For example, the generation unit 1006 creates or generates the second code CD2 as follows.

At first, an administrator who manages the tenant uses the administrator terminal 3 to input a test case name or the like. Then, if a "create" button (see FIG. 13) is clicked, the generation unit 1006 creates or generates a code to be used as an embed code of the home page 500. Then, the administrator embeds the embed code into the home page 500, and releases the home page 500 to the public.

Then, in step S103 in FIG. 11, the user terminal 2 executes the embed code used for test mode, embedded in the home page 500. As a result, the user terminal 2 obtains the script data for test mode ("chat_test3.js" in this example case) from the server 1 in step S104.

Then, in step S106, the user terminal 2 executes the script data for test mode.

Then, in step S107, the user terminal 2 notifies a request of chatbot content and the mode is the test mode to the server 1. Then, the mode setting unit 1004 determines whether the mode is the execution mode or the test mode based on the notified mode information.

Further, the destination of embedding the embed code used for test mode is not limited to the home page 500 to be released to the public. For example, the administrator can embed the embed code used for test mode in a test home page, not released to general users, and then perform the test operation.

Further, the administrator can create the script data for a plurality of test modes, and embed the script data for the plurality of test modes in different home pages, and then perform the plurality of test operations simultaneously. For example, the administrator registers the created embed code and the code ID for test mode in association with each other so that the registered code ID is displayed in a column of the created embed code used for test mode on a screen of FIG. 13.

If the administrator selects any one of the created embed code used for test modes of "test1" and "test2," the administrator terminal 3 displays the embed code used for test mode corresponding to the selected code ID in a text box. In this case, the identification information of each test mode stored in the item of "mode" of the dialogue history information (see FIG. 9) is, for example, the test mode "1" and the test mode "2."

If the mode setting unit 1004 determines that the mode is the first mode ("first mode" in step S902), the mode setting unit 1004 proceeds to the sequence to step S903.

On the other hand, if the mode setting unit 1004 determines that the mode is the second mode ("second mode" in step S902), the mode setting unit 1004 proceeds to the sequence to step S904.

In step S903, the mode setting unit 1004 sets to store or save history information of dialogue to be performed later.

In step S904, the mode setting unit 1004 sets not to store the history information of dialogue to be performed later (i.e., set to delete the history information of dialogue to be performed later).

Further, the mode setting unit 1004 can be configured to store the history information of the first mode and the history information of the second mode separately. For example, the history information of the dialogue that has occurred under the second mode (i.e., the dialogue generated under the test mode) may be stored separately from the history information of the dialogue that has occurred under the first mode (i.e., the dialogue generated under the execution mode), or the history information of the dialogue that has occurred under the second mode (i.e., the dialogue generated under the test mode) may be discarded.

When the history information of the first mode and the history information of the second mode are stored separately, for example, the mode setting unit 1004 registers information indicating any one of the modes in the item of "mode" as illustrated in FIGS. 9A and 9B.

Further, the mode setting unit 1004 can be configured to set things other than storing or saving the history information based on the mode. That is, the test operation environment can be set differently with respect to the actual operation environment. For example, the DB, script, UI, FAQ, or scenario can be set to be switched depending on the modes.

The second mode (i.e., test mode) is preferably performed using the same input, search, and response performed under the first mode. This is because it is desirable that the test operation is performed using the same processing of the actual operation as much as possible. If the second mode (i.e., test mode) is performed using the same processing of the first mode, defects or bugs to be occur under the actual operation (i.e., execution mode) can be detected easily.

Step S109 is performed as described above.

Referring back to FIG. 11, in step S110, the communication unit of the server 1 transmits information, such as content information, to the user terminal 2 to perform a dialogue using the chatbot.

In step S111, the output unit 2002 of the user terminal 2 displays the content for performing a dialogue using the chatbot.

The administrator can set to display an icon used for an operation to start the chatbot service in advance.

If the administrator sets to display the icon used for the operation of starting the chatbot service ("when displaying icon" in FIG. 11), the chatbot system 100 proceeds the sequence to step S112.

On the other hand, if the administrator does not set to display the icon used for the operation to start the chatbot service, the chatbot system 100 proceeds the sequence to step S114.

In step S112, the user UR presses, for example, an icon for starting the chatbot service. Then, the input unit 2001 of the user terminal 2 receives the operation of pressing the icon.

In step S113, the output unit 2002 of the user terminal 2 starts a dialogue using the chatbot based on the scenario. Hereinafter, a description is given of an example case when a user selects a scenario and starts a dialogue.

In step S114, the user UR performs an operation for selecting a scenario. If a plurality of scenarios is set, the output unit 2002 of the user terminal 2 displays a graphical user interface (GUI) so that the user UR can select any one of the plurality of scenarios using the GUI.

In step S115, the input unit 2001 of the server 1 receives the operation for selecting the scenario performed in step S114. Then, the communication unit of the server 1 transmits a notification indicating the selected scenario to the control unit of the server 1.

In step S116, the control unit of the server 1 identifies content to be displayed for the dialogue based on the scenario identified by the setting information.

For example, if an option of "select from all categories" is selected in step S31 (FIG. 5), the control unit of the server 1 identifies the content so as to respond "category name" of a category set by "category ID" included in the setting information that is switched in step S109.

Further, if an option of "select from FAQ" is selected in step S31 (FIG. 5), the control unit of the server 1 extracts, for example, questions of the upper fifth level based on the inquiry history information generated within a pre-set time period.

For example, if a scenario of "checking extension telephone" is selected in step S114, the control unit of the server 1 identifies the content to respond a pre-set message, such as "please enter name."

In step S117, the communication unit of the server 1 transmits the content to be displayed to the user terminal 2.

In step S118, the output unit 2002 of the user terminal 2 displays the content transmitted in step S117. Hereinafter, it is assumed that the question, search, and response are performed as illustrated in FIG. 5 based on the scenario determined in step S109.

In step S119, the user UR performs an operation to input a question to the user terminal 2. Then, in step S119, the input unit 2001 of the user terminal 2 receives the input of the question. Then, the input unit 2001 of the user terminal 2 generates the input information indicating the received question.

In step S120, the input information acquisition unit 1001 acquires the input information from the user terminal 2.

In step S121, the search unit 1002 searches response information to the input information.

In step S122, the response unit 1003 responds the response information. In step S122, the response unit 1003 may respond the response message that is created by performing a given processing on the response information. That is, the response unit 1003 may respond the response message based on the response information. In step S123, the output unit 2002 of the user terminal 2 displays an answer to the question based on the response information.

The processing of step S119 to step S123 may be repeated, as needed. Further, after responding the answer, that is, after performing step S123, the processing of steps S124 to S128 may be performed by the chatbot system 100.

In step S124, the output unit 2002 of the user terminal 2 displays an input item for investigating or checking a satisfaction level of user. That is, the output unit 2002 of the user terminal 2 displays a GUI of questionnaire to be used for investigating or checking the satisfaction level of user for the answer obtained in step S123, in which the GUI is used by the user to input the satisfaction level.

In step S125, the user UR inputs the satisfaction level using the GUI.

In step S126, the communication unit of the user terminal 2 notifies the content input by the user UR in step S125, that is, a result of questionnaire, to the server 1.

In step S127, the storage unit 1005 of the server 1 stores history information of the content or dialogue content notified in step S126.

In step S128, the control unit of the user terminal 2 returns the sequence to, for example, step S112 or step S114. That is, the control unit of the user terminal 2 returns the sequence to the initial screen of the chatbot service. Further, in step S128, the chatbot system 100 may terminate the chatbot.

After storing the history information as described above, the chatbot system 100 performs the processing of step S129 and subsequent steps. For example, when the administrator AD performs an operation of displaying the statistical result, the chatbot system 100 performs the processing of step S129 and subsequent steps.

In step S129, the communication unit of the administrator terminal 3 notifies a start of the statistical processing to the server 1.

In step S130, the statistical processing unit 1007 performs the statistical processing on the history information stored in step S127.

In step S131, the statistical processing unit 1007 transmits a statistical result to the administrator terminal 3. Then, the output unit of the administrator terminal 3 outputs the statistical result. For example, the output unit of the administrator terminal 3 outputs the statistical result as indicated in FIG. 14.

Figure 14:
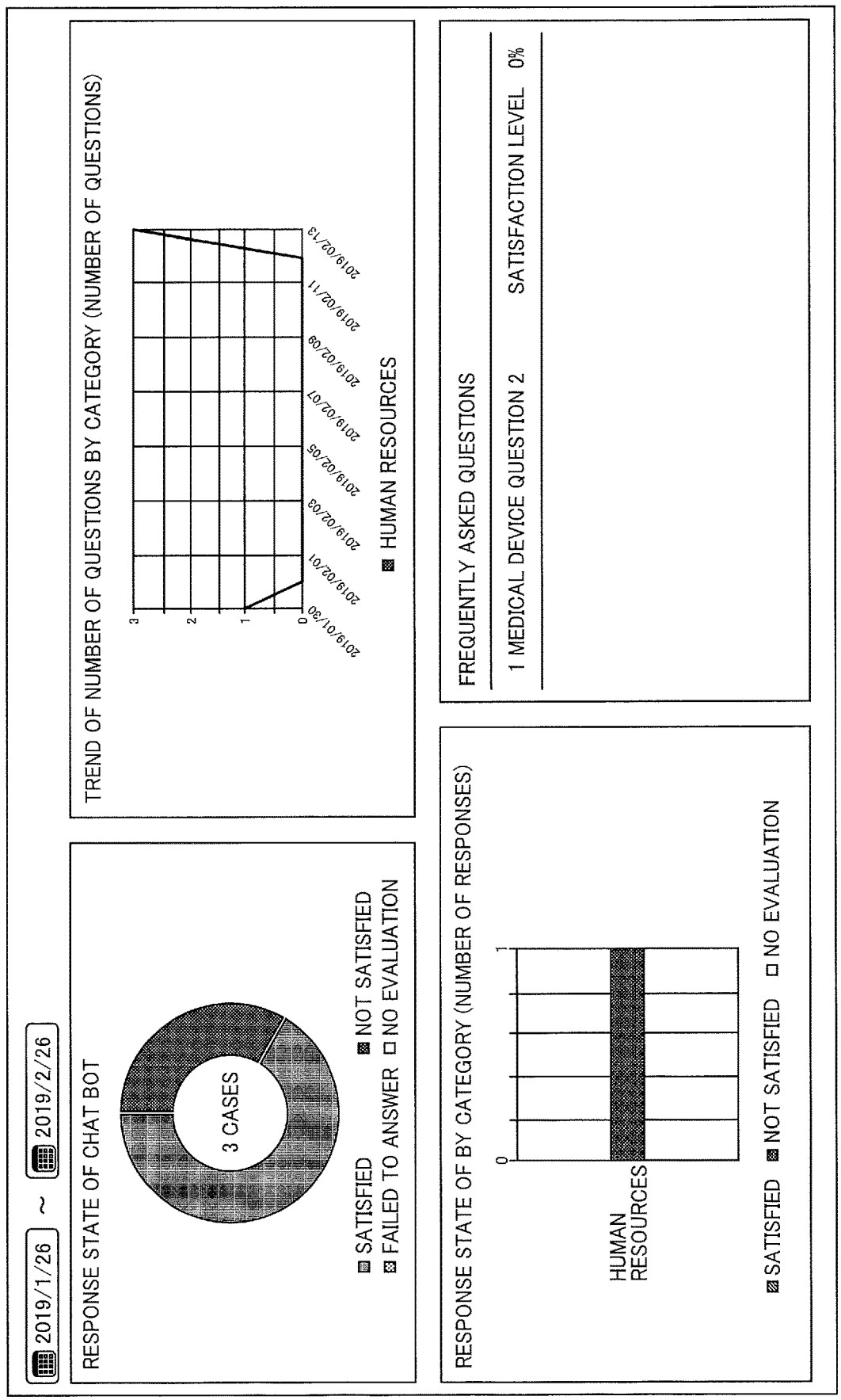
FIG. 14 is an example of displaying style of statistical result.

FIG. 14 is an example of displaying style of statistical result. For example, the administrator terminal 3 displays statistical results as graphs as illustrated in FIG. 14.

The "response state of chatbot" is an example of result of statistical processing of satisfaction level entered by the user UR in step S125. Specifically, the administrator terminal 3 displays the satisfaction level of the dialogue that was performed using the chatbot within the given time period to the administrator AD using a graph or the like. For example, the user UR inputs or enters the satisfaction level such as "satisfied," "unsatisfactory," "failed to answer," or "no evaluation." Based on a feedback of the result of statistical processing of satisfaction level, the administrator AD can check or recognize the objective satisfaction level to the chatbot.

The statistical processing unit 1007 can summarize the result obtained by analyzing the contents of questions included in the history information by performing the statistical processing, such as what category question is asked for many times, and what kind of questions are frequently asked for. Further, the statistical processing unit 1007 can perform the statistical processing on "trend of number of questions by category (number of questions)" and "frequently asked questions" to figure out what category question is asked for many times, and what kind of questions are frequently asked for. Further, the statistical processing unit 1007 can perform the statistical processing for each category, such as "response status by each category (number of responses)".

As described above, the chatbot system 100 stores the history information separately based on the modes. For example, since the dialogue used for test mode is excluded from the history information to be subjected to the above described statistical processing, the chatbot system 100 can perform the statistical processing on the satisfaction level of the user UR entered for the actual operation (i.e., execution mode). That is, the chatbot system 100 can generate the statistical result not including the satisfaction level entered for the test mode.

The test operation is performed by the administrator or staff assigned to the test mode. Further, as to the test operation, the administrator or staff assigned to the test mode may also input the satisfaction level. The history information or input information obtained by performing the test operation is preferably excluded from the history information to be subjected to the above described statistical processing. That is, if the satisfaction level obtained by performing the test operation is mixed with the satisfaction level input by the user UR (i.e., actual user) to be subjected to the above described statistical processing, the precision of statistical result may deteriorate.

If the satisfaction level of low is obtained as a result of the statistical processing, FAQ may not be appropriate to questions asked by the user UR. Therefore, if the satisfaction level is low, the administrator AD may be notified that the satisfaction level is low. Therefore, if the satisfaction level is obtained with a higher precision, the administrator AD can appropriately improve FAQ or the like so that the satisfaction level of the user UR becomes higher. Therefore, the chatbot system 100 can improve the satisfaction level of the user UR to the chatbot.

Further, if a separate chatbot is disposed for performing the test mode alone, or if a work of removing the input of the user UR from the statistical result is performed in the chatbot system 100, the workload of user UR increases and the workload for performing the test mode increases. Therefore, the chatbot system 100 stores the history information or the like separately based on the modes using the above described configuration. Therefore, the chatbot system 100 can easily remove the history information of the test operation (i.e., test mode) from the history information of the actual operation (i.e., execution mode) that is performed after performing the test operation. Therefore, the chatbot system 100 can generate the statistical result with a higher precision without a workload for excluding the history information entered for the test operation. Therefore, the chatbot system 100 can perform the test operation of the chatbot easily and simply.

The chatbot is operated under the test mode, such as test operation of checking and/or debugging, which is different from the actual operation (i.e., execution mode). For example, if the history information is stored without distinguishing the history information obtained under a plurality of modes, the precision of statistical processing on the history information may decrease. Therefore, the chatbot system 100 stores the history information of chatbot by distinguishing the operation status of the chatbot based on the modes. That is, the information processing system employing the above described configuration can store the history information of the chatbot by distinguishing the operations status of the chatbot based on the modes.

As to conventional methods, for example, before using a chatbot for an actual operation, the chatbot is operated for testing under conditions, such as checking operation of the chatbot, debugging the chatbot, different from conditions of the actual operation. As to conventional methods, operation history information of the chatbot obtained under different conditions may be stored without distinguishing the operation history information of the chatbot obtained under different conditions. As a result, the precision of statistical processing on the operation history information of the chatbot may deteriorate.

As to the above described embodiment, operation history information of the chatbot can be obtained and stored while distinguishing the operation history information of the chatbot obtained under different conditions.

In the above described information processing system, each step of the information processing method may be performed by a plurality of information processing apparatuses in parallel, distributed or redundantly. Further, the information processing system can be configured to utilize so-called cloud computing or the like.

Further, each apparatus may not be one apparatus. That is, each apparatus may be a combination of a plurality of apparatuses. Further, the information processing system may further include one or more apparatuses other than the apparatus described above.

Further, the information processing system and the information processing apparatus may use an artificial intelligence (AI) or the like. For example, the information processing system and the information processing apparatus can be configured to perform the machine learning or the like for inputting text to improve the recognition precision.

Further, a part of an entire of the processing according to the above described embodiment may be implemented by one or more programs described in a computer language and executable by a computer for performing the information processing method. That is, the one or more programs is computer programs for performing the information processing method by the computer such as the information processing apparatus or information processing system.

Therefore, when the information processing method is performed by executing the program, the computing device and the control device of the computer perform operations and controls based on the program to perform the respective procedures. Further, a storage device of the computer stores data used for processing based on the program to perform each procedure.

Further, the program can also be recorded on a computer-readable storage medium and distributed. Further, the storage medium may be magnetic tape, flash memory, optical disk, magneto-optical disk, magnetic disk, or the like. Further, the program may be distributed through a communication line.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each function of the above-described embodiment can be implemented by one or more processing circuits. The "processing circuit" includes a processor which is programmed to perform each function by software such as a processor implemented by an electronic circuit, and device designed to perform each function described above, such as application specific integrated circuit (ASIC), digital signal processor (DSP), field programmable gate array (FPGA), conventional circuit module, or the like.

What is claimed is:

1. An information processing apparatus connectable with a user terminal via a network, the information processing apparatus comprising:
   circuitry configured to:
   acquire information input to the user terminal by a user;
   search response information to be responded to the input information;
   respond, to the user terminal, a response message based on the response information to the input information;
   set a first mode for performing a first dialogue with the user terminal; wherein the first dialogue is an actual operation dialogue;
   set a second mode for performing a second dialogue with the user terminal; wherein the second dialogue is a test operation dialogue;
   store a record of the first dialogue in association with a first information item indicating the first mode;
   store a record of the second dialogue in association with a second information item indicating the second mode;
   determine modes at the time of performing the first dialogue and the second dialogue, based on identification information from the user terminal; and
   selectively perform statistical processing with respect to the first dialogue by differentiating between the first mode and the second mode based on the first information item and the second information item.

2. The information processing apparatus according to claim 1,
   wherein the circuitry generates an embed code used for performing a dialogue, and the circuitry sets the mode used for performing the dialogue based on the embed code.

3. The information processing apparatus according to claim 2,
   wherein the embed code is a uniform resource locator (URL) differently set for the first mode and the second mode.

4. The information processing apparatus according to claim 1,
   wherein the statistical processing produces a result including a satisfaction level of the user.

5. The information processing apparatus according to claim 1,
   wherein the circuitry performs the same processing for performing the first dialogue under the first mode, and the second dialogue under the second mode.

6. An information processing system comprising:
   a user terminal configured to receive an input from a user; and an information processing apparatus connectable with the user terminal via a network, the information processing apparatus including circuitry configured to:
acquire information input to the user terminal by a user;
search response information to be responded to the input information;
respond, to the user terminal, a response message based on the response information to the input information;
set a first mode for performing a first dialogue with the user terminal; wherein the first dialogue is an actual operation dialogue;
set a second mode for performing a second dialogue with the user terminal; wherein the second dialogue is a test operation dialogue;
store a record of the first dialogue in association with a first information item indicating the first mode;
store a record of the second dialogue in association with a second information item indicating the second mode;
determine modes at the time of performing the first dialogue and the second dialogue, based on identification information from the user terminal; and
selectively perform statistical processing with respect to the first dialogue by differentiating between the first mode and the second mode based on the first information item and the second information item.

7. The information processing system according to claim 6,
wherein the circuitry generates an embed code used for performing a dialogue, and the circuitry sets the mode used for performing the dialogue based on the embed code.

8. The information processing system according to claim 7,
wherein the embed code is a uniform resource locator (URL) differently set for the first mode and the second mode.

9. A method of processing information using an information processing apparatus connectable to a user terminal via a network, the method comprising:
acquiring information input to the user terminal by a user;
searching response information to be responded to the input information;
responding, to the user terminal, a response message based on the response information to the input information;
setting a first mode for performing a first dialogue with the user terminal; wherein the first dialogue is an actual operation dialogue;
setting a second mode for performing a second dialogue with the user terminal; wherein the second dialogue is a test operation dialogue;
storing a record of the first dialogue in association with a first information item indicating the first mode;
storing a record of the second dialogue in association with a second information item indicating the second mode;
determining modes at the time of performing the dialogue, based on identification information from the user terminal; and
selectively performing statistical processing with respect to the first dialogue by differentiating between the first mode and the second mode based on the first information item and the second information item.

10. The method according to claim 9, further comprising:
generating an embed code used for performing a dialogue; and
setting the mode used for performing the dialogue based on the embed code.

11. The method according to claim 10,
wherein the embed code used for performing the dialogue is a uniform resource locator (URL) differently set for the first mode and the second mode.

* * * * *